(12) United States Patent
Nagao

(10) Patent No.: US 7,233,356 B2
(45) Date of Patent: Jun. 19, 2007

(54) DIGITAL CAMERA AND IMAGE EDITING SYSTEM

(75) Inventor: Seiji Nagao, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 751 days.

(21) Appl. No.: 10/352,895

(22) Filed: Jan. 29, 2003

(65) Prior Publication Data
US 2003/0160878 A1 Aug. 28, 2003

(30) Foreign Application Priority Data
Jan. 29, 2002 (JP) .............................. 2002-19766

(51) Int. Cl.
*H04N 5/222* (2006.01)
(52) U.S. Cl. .............................. 348/333.02; 348/231.3
(58) Field of Classification Search .......... 348/333.02, 348/333.12
See application file for complete search history.

(56) References Cited

U.S. PATENT DOCUMENTS

| | | | |
|---|---|---|---|
| 5,633,678 A * | 5/1997 | Parulski et al. | 348/231.5 |
| 6,204,877 B1 * | 3/2001 | Kiyokawa | 348/211.3 |
| 6,567,120 B1 * | 5/2003 | Hamamura et al. | 348/207.99 |
| 6,614,988 B1 * | 9/2003 | Sampsell | 386/95 |

FOREIGN PATENT DOCUMENTS

| | | |
|---|---|---|
| JP | 4-354483 | 12/1992 |
| JP | 6-98224 | 4/1994 |
| JP | 7-202982 | 8/1995 |
| JP | 7-296001 | 11/1995 |
| JP | 8-315106 | 11/1996 |
| JP | 9-37125 | 2/1997 |
| JP | 9-298678 | 11/1997 |
| JP | 11-98404 | 4/1999 |
| JP | 2000-29091 | 1/2000 |
| JP | 2001-184439 | 7/2001 |

* cited by examiner

*Primary Examiner*—Ngoc-Yen Vu
*Assistant Examiner*—Anthony J. Daniels
(74) *Attorney, Agent, or Firm*—Oblon, Spivak, McClelland, Maier & Neustadt, P.C.

(57) ABSTRACT

A digital camera and an image editing system capable of inputting information corresponding to each photographed image every time a picture is taken. When an editing mode transfer switch is depressed in a photographing mode, a memo setting screen is displayed Then, if a text-based input title is selected, a soft keyboard is displayed, and text data is inputted from a touch panel on the by operating a touch pen so as to edit a memo. Then, the operation returns to the photographing mode, and a shutter button is depressed, so that image data is fetched from a imaging element to be stored in a memory card as an image file. At this time, memo information is stored in a header of the file format. When transmitting the image file, the file is also sent together with the memo information.

4 Claims, 9 Drawing Sheets

DIGITAL CAMERA AND IMAGE EDITING SYSTEM

BACKGROUND OF THE INVENTION

1. Field of the Invention

The present invention relates to a digital camera and an image editing system using this digital camera.

2. Description of the Prior Art

Recently, digital cameras have been in widespread used in place of analog cameras. The advantages of the digital cameras are as follows.

- Images photographed can be directly viewed on a display device such as a liquid crystal display (LCD) of a camera, and the like.
- Images unsuccessfully photographed can be cancelled.
- Images photographed can be stored in a personal computer (hereinafter referred to as "PC") to be processed and edited by digital processing with ease.
- Printing of images is available by means of the PC, and the images can be transmitted as digital files.
- By transferring photographed images to the PC, digital images can be stored without degradation.
- Multimedia images such as moving images and sounds can be handled.

For these reasons, the digital cameras have increasingly been used with the spread of PC. Further, in the digital cameras, the number of pixels is increased as technology of CCD advances. For example, digital cameras having 2.0 mega pixels to 3.0 mega pixels or more have been on sale. Thus, the digital cameras have come in widespread use not only in a consumer market but also in a business market.

An example of a digital camera used in a car insurance company in a business market will be described below.

In the car insurance company, the following business flow will take place when a vehicle is insured.

1) The vehicle is photographed (to obtain about ten prints) by the digital camera (so as to confirm damage and the like).
2) Data on the vehicle (vehicle type, insurance number, and the like) are described or recorded.
3) Photographs of the vehicle are displayed on the PC to be edited, and then editing such as attaching the insurance number to the image is performed.
4) An external medium including the photographed images and the data are mailed or transmitted by e-mail to a person in charge of estimate.
5) The photographed images are stored in a database of the PC. At this time, the insurance number and the like are inputted.

Conventionally, in the photographs a date and a photographer's name can be included. That is, in a set-up mode, settings of the date and the photographer's name are inputted, and then a position of the photograph for such information to be entered, namely an upper right position, an upper left position, a lower left position, or a lower right position is set, so that the date and the photographer's name are entered into the photographed image.

However, once data including the date, the photographer's name, or the like is set, it will not to be changed at each time of photographing. So, data corresponding to each photographed image cannot be inputted.

Conventionally, as mentioned in the above-mentioned business example, photographed images are grabbed or captured into a personal computer, and then an insurance number for business or a scene number is inputted with the aid of image editing application software on the personal computer.

SUMMARY OF THE INVENTION

The present invention has been accomplished to solve such problems, and it is an object of the present invention to provide a digital camera and an image editing system which permit inputting of information corresponding to each photographed image and which allow editing of the information corresponding to the image, every time a photographer takes a picture.

To achieve the above-mentioned object, according to the present invention, there is provided a digital camera comprising: imaging means for converting an optical image of a subject into an electric signal and for outputting image data including said electric signal; display means for displaying a photographed image and various setting screens; shutter means for outputting a fetching signal of the image data which serves as the photographed image; mode switching means for switching various modes; and an information recording medium for recording the image data as an image file in a format for storage of the image data together with information associated with the image, wherein the digital camera further comprises switching means for switching to a memo setting screen for setting textual information to be added to the image data, and switching means for switching to a title setting screen that is adapted for setting a title to be displayed on the memo setting screen in response to the textual information. The digital camera further comprises switching means for switching to an editing screen for editing the textual information, and control means for recording the title and the textual information in a header of the format when the image data is grabbed by operating the shutter means.

With this configuration, information corresponding to each image at every photographing time can be inputted into the image, while a memo is attached together with the title to the header of the format recording the image data therein, whereby such image and memo data is handled as one image file. Thus, when editing the photographed image on the personal computer, the information concerning the image data can be obtained by reading out the header of the image file, thereby to omit operations such as inputting characters by means of image editing application software as required in the prior art. Further, since the title displayed on the memo setting screen is able to be edited, for example when a plurality of pictures are taken, a title common to the photographed images can be set.

The digital camera further comprises switching means for switching from a monitoring screen of the display means placed in a photographing mode of photographing the subject to the memo setting screen. This permits editing of the memo before photographing.

In the photographing mode, the textual information inputted from the memo setting screen is displayed together with the subject on the monitoring screen of the display means. With this configuration, contents of the memo edited are to be confirmed before photographing.

In this configuration, there is further provided means for displaying on the monitoring screen the textual information inputted from the memo setting screen, while determining whether a function of recording in the information recording medium is performed or not in a set-up mode of setting various functions. This configuration permits setting of an unusable state of the memo editing function if it is unnecessary.

When switching display of the display means from a reproducing screen in a reproduction mode to the editing screen, on the memo setting screen displayed by the display means, the title and the textual information read from the information recording medium are displayed, and contents of the textual information are edited, so that contents recorded in the header are updated. With this configuration, the contents of the memo attached to the image data previously photographed are able to be altered.

In the above-mentioned configuration, there is provided communication means for transmitting the image file, and in the set-up mode, a specific communication scheme is assigned from among a plurality of communication schemes. When transmitting the image file, the specific communication scheme is automatically set to the communication means. This permits saving a trouble to designate a communication scheme for every image file.

In the above-mentioned configuration, there is further provided communication means for transmitting the image file, and when transmitting the image file in the set-up mode, it is determined whether the image file already transmitted is automatically cancelled or not. This configuration prevents leaving a needless image file on the camera side, thereby maintaining recordable areas of the information recording medium. This also prevents the same image file from being transmitted twice to the other end.

According to the present invention, there is provided an image editing system comprising the digital camera, and an external terminal for editing the image data of the image file transmitted from the digital camera or information associated therewith. With this configuration, the use of the image file transmitted from the digital camera allows editing of the image data or the associated information.

DETAILED DESCRIPTION OF THE PREFERRED EMBODIMENTS

Figure 1:
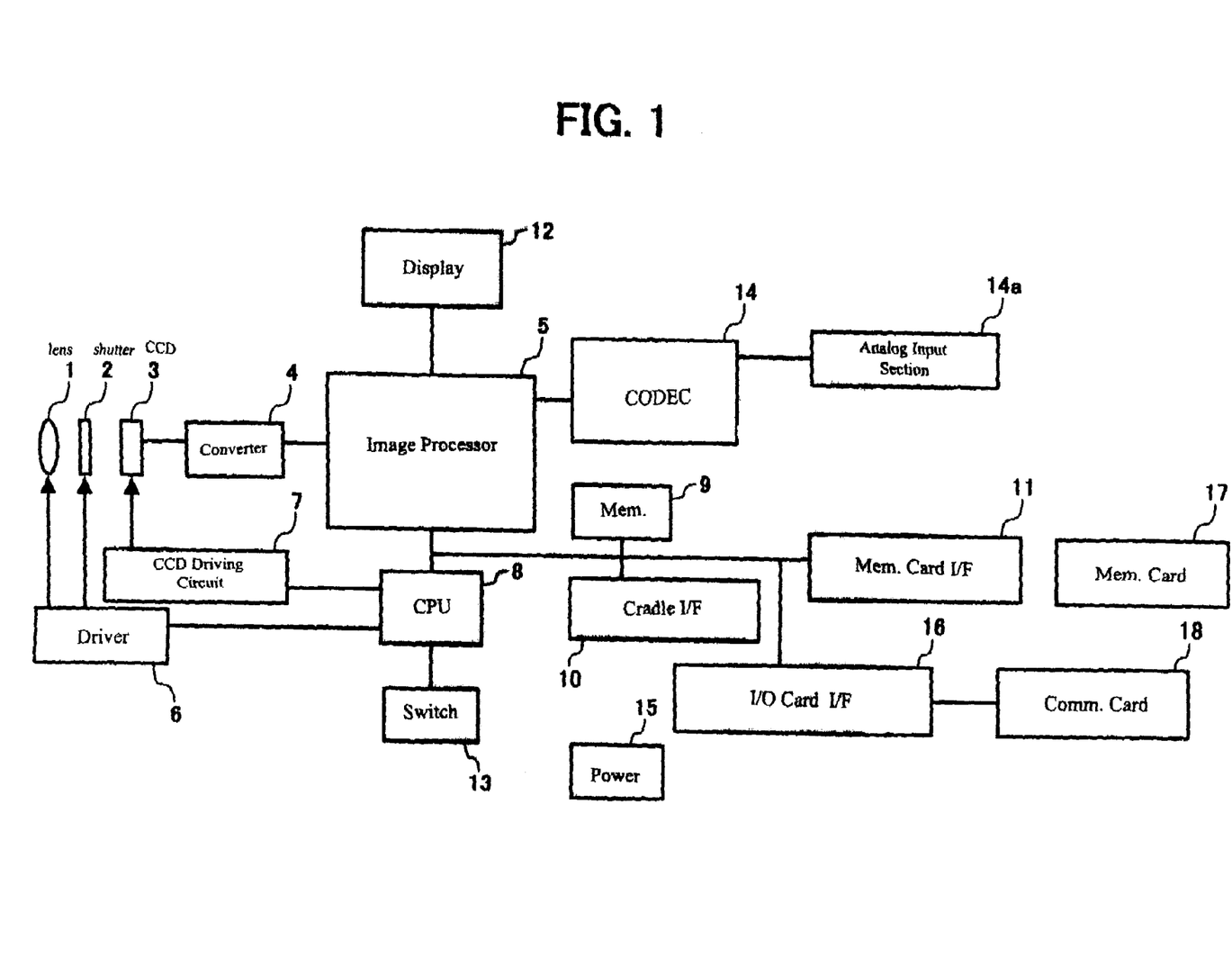
FIG. 1 is a block diagram showing a circuit configuration of a digital camera according to one preferred embodiment of the present invention.

In FIG. 1, reference numeral 1 denotes a photographing lens, reference numeral 2 a mechanical shutter, and reference numeral 3 a charge coupled device (CCD). Reference numeral 4 designates a converter for performing correlative double sampling and A/D conversion of a CCD signal from the CCD 3. Reference numeral 5 represents an image processor for converting a digital signal from the converter 4 into YUV data with brightness Y, color-difference U, and V signal, for performing JPEG compression of the YUV data, and for altering an image size. Reference numeral 6 denotes a driver for performing focus driving of the photographing lens 1 and for opening and closing the mechanical shutter 2. Reference numeral 7 denotes a CCD driving circuit for driving the CCD 3, and reference numeral 8 a CPU for controlling an entire digital camera. Reference numeral 9 denotes a memory mounted in a camera body for temporarily storing photographed image data and read data from a file stored in a memory card. This memory 9 is used as a work memory for the image processor 5 and the CPU 8.

Reference numeral 10 denotes a cradle I/F. Through this cradle I/F 10, the camera body is connected to a cradle not shown, to which a PC is connected. Thus, images photographed by the digital camera are transferred to the PC, otherwise set contents edited on the PC are sent to the digital camera. Reference numeral 11 denotes a memory card I/F connected to a memory card 17 which is attachable and detachable to and from the digital camera body. Reference numeral 12 denotes display means or a display that comprises a display controller for converting video output signals from the image processor 5 into signals that are capable of being displayed by a liquid crystal display, and a liquid crystal monitor for actually displaying video. Reference numeral 13 denotes a switch including a release switch, a T/W key for zoom operation, a power key, and the like. Reference numeral 14 designates a sound CODEC. This sound CODEC 14 converts a signal from an input analog section 14a to digital form to store it in the memory 9 as sound data, so that it is saved in the memory card as a file. Otherwise, the sound CODEC converts a sound file to analog form when reproducing to make it reproduced by a speaker in an output section. Such a CODEC is used for recording and reproducing of images with moving images and sound included therein or for postrecording. Reference numeral 15 indicates a power source section for supplying power to the entire system. Reference numeral 16 denotes an I/O communication card I/F connected to a communication card 18 such as a modem card, a wireless LAN card, a wired LAN card, or the like, for performing e-mail transmission and/or FTP transmission of the photographed images via the communication card 18.

Figure 2A:
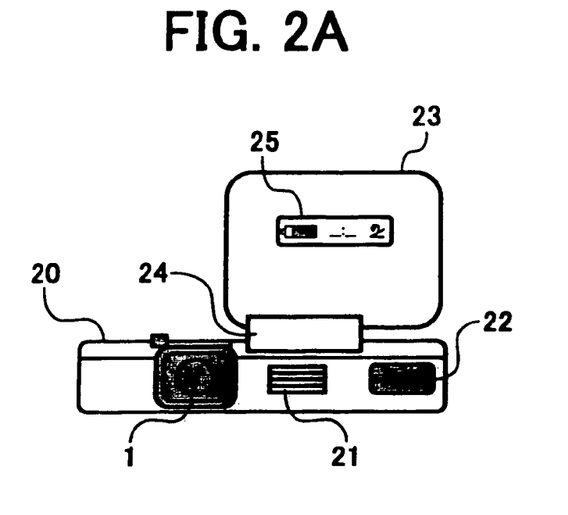
FIG. 2 is an explanatory diagram showing an outward appearance of the digital camera.
Figure 2B:
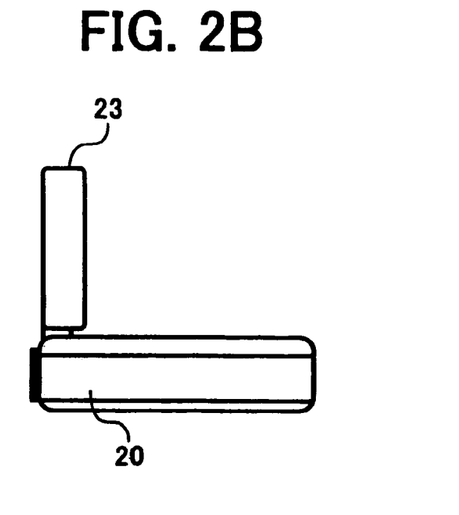
Figure 2C:
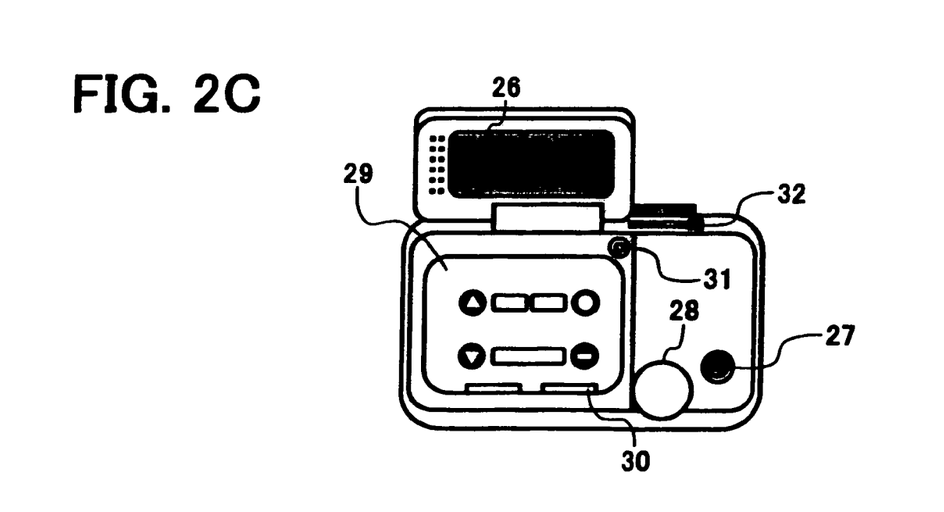

In FIG. 2, reference numeral 20 denotes the camera body, reference numeral 21 a strobe, reference numeral 22 a finder, and reference numeral 23 an upper lid. Reference numeral 24 denotes a hinge for pivotally supporting the upper lid 23 on the camera body 20. Reference numeral 26 denotes a liquid crystal monitor, reference numeral 27 a release switch, reference numeral 28 a mode switching dial, reference numeral 29 an operating panel, reference numeral 30 an editing mode transfer switch, reference numeral 31 an upper-lid opening and closing detection switch, and reference numeral 32 a barrier opening and closing knob for opening and closing a barrier (not shown) that protects the photographing lens 1.

With the upper lid 23 closed, the camera body has a substantially rectangular shape. The photographing lens 1, the strobe 21, and the finder 23 are disposed on the front of the camera body, while the release switch 27, the mode switching dial 28, the operating panel 29, the editing mode transfer switch 30, and the upper-lid opening and closing detection switch 31 are disposed on the side of the camera body. On the edge of the camera body in the vicinity of the operating panel 29, the upper lid 23 is pivotally attached through the hinge 24. A sub-LCD 25 is provided on the surface of the upper lid 23, while the liquid crystal monitor 26 is disposed on the back surface thereof.

In a case where the upper lid 23 is open and the upper-lid opening and closing detection switch 31 detects its opening, the liquid crystal monitor 26 is driven to display an image. In a case where the upper-lid opening and closing detection switch 31 detects closing of the upper lid 23, driving of the liquid crystal monitor 26 is terminated. With the upper lid 23 closed, the operating panel 29 and the liquid crystal monitor 26 are opposed to each other.

A touch panel is disposed on the liquid crystal monitor 26. By depressing a title portion displayed on the liquid crystal monitor 26 by means of a touch pen (not shown), a corresponding signal is sent to the CPU 8.

The mode switching dial 28 is operated to switch among a photographing mode, a reproduction mode, a set-up mode for reset, a PC mode in which an image file is transferred to the PC, a transmission mode in which the image file is transmitted over a communications circuit, and the like, causing display on a screen of the liquid crystal monitor 26 to be switched corresponding to the mode.

The editing mode transfer switch 30 is to perform switching to a mode (hereinafter referred to as "editing mode") for editing a memo comprising text information to be attached to the photographed images.

In the embodiment, by depressing the release switch 27 in the photographing mode, the image data is stored in the memory card 17 in a file of a format standard set by an Exif (exchangeable image file format). The text information generated in the editing mode is stored in a header of the Exif format. For example, when the image file is transferred to the PC in the PC mode, text data is also transferred together with the image data.

In the editing mode, many pieces of text information are able to be edited to be stored in the header of the Exif format. On the liquid crystal monitor 26, a title corresponding to the text information to be inputted is displayed. This title can also be set in the set-up mode.

Now, setting processes of the title will be explained below with reference to FIG. 1, FIG. 3, and FIG. 4.

Figure 3:
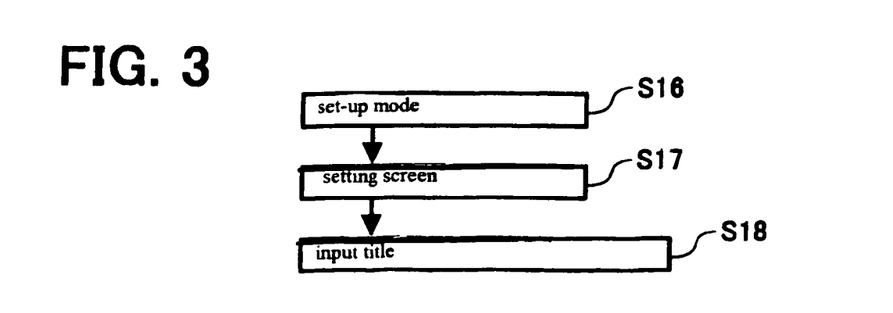
FIG. 3 is a flowchart showing setting processes of a title to be displayed on a display screen when an editing mode transfer switch is depressed in a photographing mode.

First, as shown in FIG. 3, the set-up mode is started up by the operation of the mode switching dial 28 (S16). At this time, several alternatives including registration of a photo shooting date, registration of a photographer, setting of an image size, setting of image quality, and the like are displayed on the liquid crystal monitor 26. Among these alternatives, setting of a camera-memo function is selected by the touch pen, causing a setting screen for the camera-memo function to be displayed (S17) as shown in FIG. 4.

Figure 4:
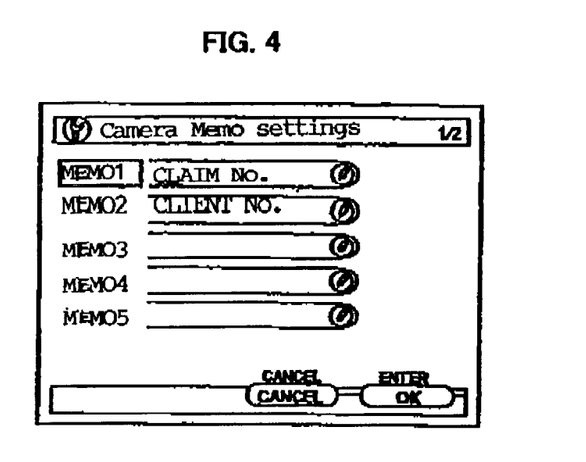
FIG. 4 is an explanatory diagram showing a setting screen of the title to be displayed on the display screen when the editing mode transfer switch is depressed in the photographing mode.

In the embodiment, as illustrated in FIG. 4, five kinds of memos including MEMO 1 to 5 are available. If the title has already inputted, the inputted title is displayed as it is. When the title is to be edited, a software keyboard (hereinafter referred to as "soft keyboard") is displayed on the liquid crystal monitor 26 by selecting a pen-shaped icon disposed on the side of items. A title is inputted by operating this soft keyboard (S18), so that the title to be registered is newly generated or the title is updated to be reflected in the liquid crystal monitor 26. In FIG. 4, a column of the MEMO 1 has a title "CLAIM No." inputted therein, and a column of the MEMO 2 a title "CLIENT No.". When the registered contents are right, the title is stored in the memory 9 by selecting "OK". It should be noted that although the input of the title is performed by displaying the above-mentioned keyboard and inputting with the touch pen, it is not limited thereto and can be carried out by gaining set-up data from an external PC.

Now, the editing mode will be described hereinafter.

Figure 5:
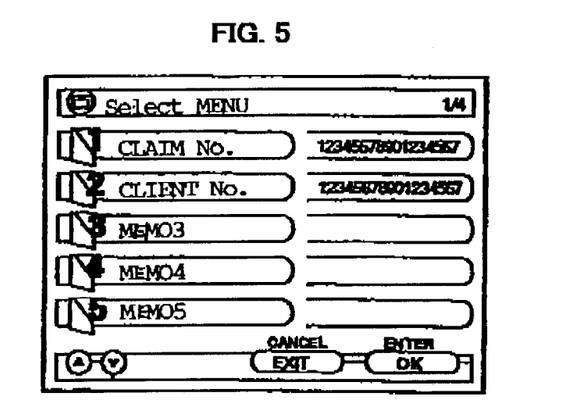
FIG. 5 is an explanatory diagram showing the display screen when the editing mode transfer switch is depressed in the photographing mode.

The photographing mode is started up by operating the mode switching dial 28. By depressing the editing mode transfer switch 30 with the monitoring screen of a subject displayed on the liquid crystal monitor 26, a menu screen is displayed, wherein the titles set in the set-up mode, that is, for example, "CLAIM No.", "CLIENT No.", "MEMO 3", "MEMO 4", and "MEMO 5" when set as shown in FIG. 4 are displayed as illustrated in FIG. 5. When contents of the memo are already inputted in an input column disposed on the side of the tile, the memo contents are displayed as they are. Thereafter, a desired title, for example "CLAIM No." is selected by the touch pen, and then the "OK" is selected, whereby the operation returns to the photographing mode. At this time, the memo contents registered in the input column of the "CLAIM No." are displayed on the liquid crystal monitor 26 as shown in FIG. 6.

Figure 6:
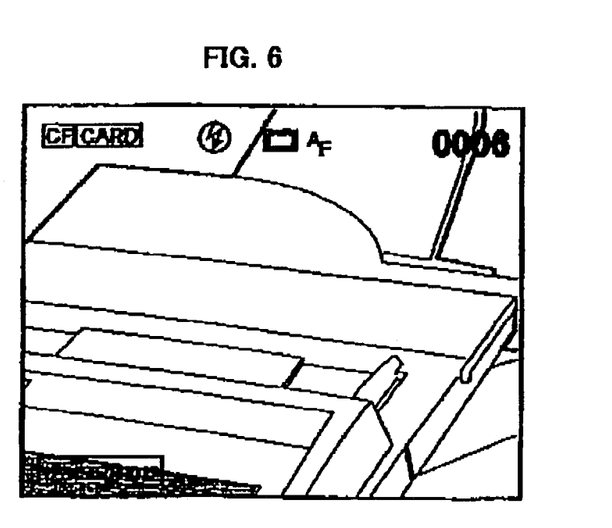
FIG. 6 is an explanatory diagram showing a monitoring screen in the photographing mode.

It should be noted that although the memo contents displayed on the liquid crystal monitor 26 correspond to the item "CLAIM No." in an example of FIG. 6, they may be selected and set for every title, thereby displaying a plurality of memo contents. Also, the display control may be carried out such that the titles are simultaneously displayed.

Figure 7:
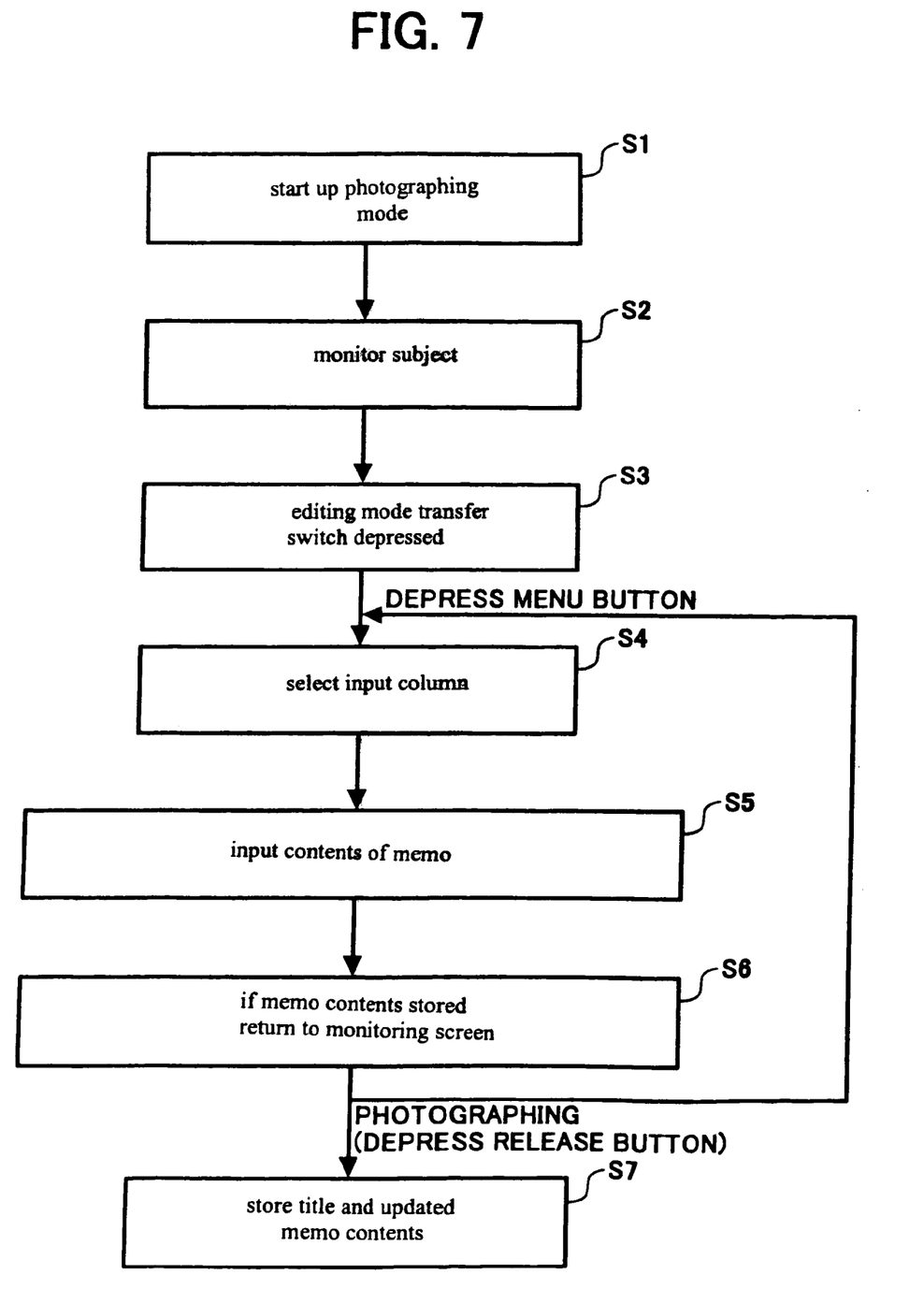
FIG. 7 is a flowchart showing editing processes of a memo.

Now, editing processes of the memo will be described below with reference to a flowchart as shown in FIG. 7.

After starting up in the photographing mode (S1), with monitoring screen of a subject displayed on the liquid crystal monitor 26 (S2), the editing mode transfer switch 30 is depressed (S3) to display a setting screen shown in FIG. 5. On this setting screen, an input column disposed on the side of a desired title is selected by the touch pen (S4), so that the soft keyboard is displayed on the liquid crystal monitor 26. By operating this keyboard, the contents of a memo is inputted (S5), and then the memo contents edited are displayed on the side of the title. If the memo contents are right, the selection of the "OK" causes the memo contents to be stored in the memory 9. Thus, the operation returns to the monitoring screen (S6).

When actually photographing after registration of the memo contents, the title and the memo contents are stored in the header of the Exif format. Similarly, every time a subject to be photographed is changed, the editing mode transfer switch 30 is depressed to start up the editing mode, so that memo contents are altered. Thus the memo contents displayed on the monitoring screen of the liquid crystal monitor 26 are updated. When photographing, the title and the updated memo contents are stored in the header of the Exif format (S7).

An example of a specification of the Exif header will be described hereinafter.

User Comment Tag

GAT-TAG (NULL) Textdata-item1 (NULL) Textdata-item2 (NULL)

Textdata-item3 (NULL) Textdata-item4 (NULL)

Textdata-item5 (NULL) (NULL)

The above-mentioned "GAT-TAG" denotes an identifier of automatic text generation, and the (NULL) denotes OOH.

Figure 8:
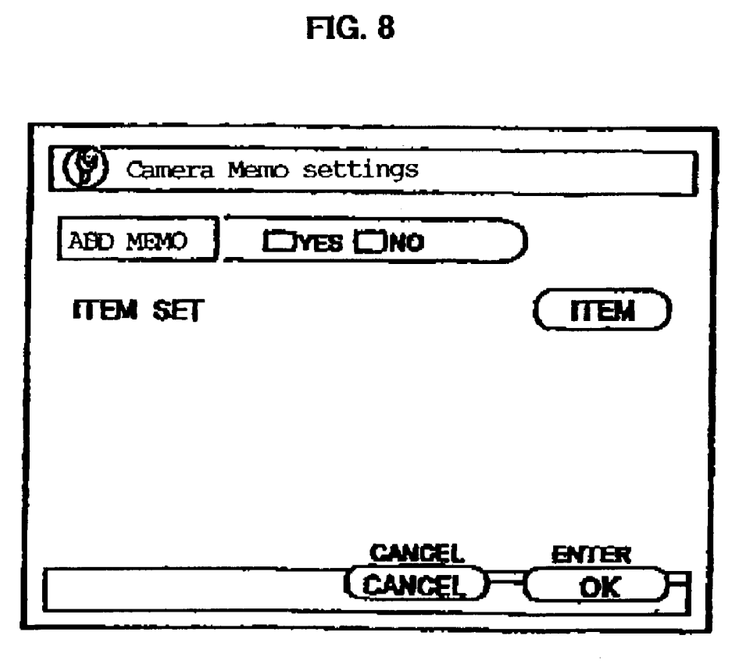
FIG. 8 is an explanatory diagram showing a screen for determining whether a camera-memo function is utilized or not.

FIG. 8 shows an explanatory diagram of a screen for determining whether the camera-memo function is utilized or not. Whether the camera-memo function is used or not is set by displaying the setting screen of FIG. 6 on the liquid crystal monitor 26 in the set-up mode.

Generally, a consumer or user does not very often utilize the camera-memo function. Accordingly, provision of a setting mode for setting the use of the camera-memo function makes it possible to cope with the memo so that it is not displayed on the monitoring screen.

Figure 9:
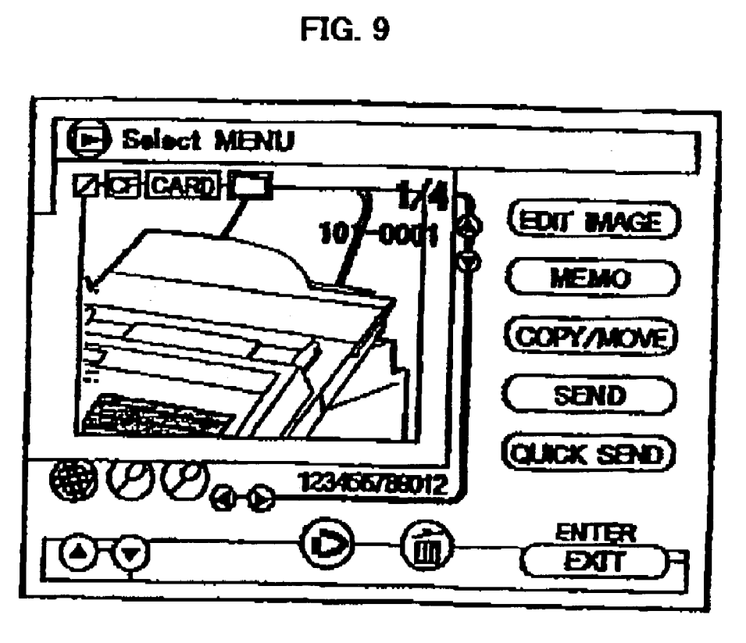
FIG. 9 is an explanatory diagram showing a display screen in a reproduction mode.
Figure 10:
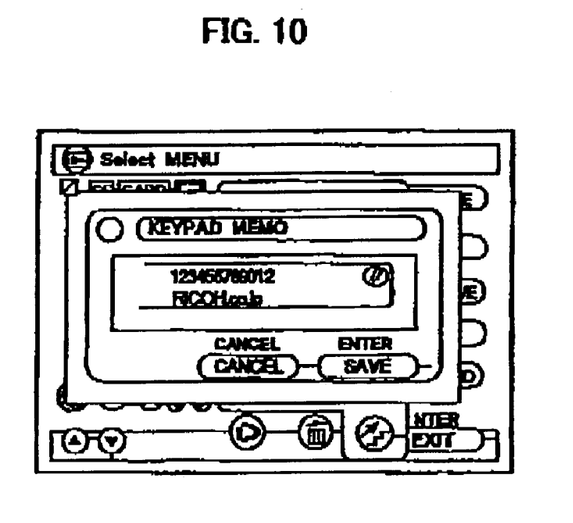
FIG. 10 is an explanatory diagram showing a display screen when selecting "MEMO" in FIG. 9.

When switching to the reproduction mode by operating the mode switching dial 28 after photographing, photographed data is read from the image file stored in the memory card 17, so that the memo contents are also displayed with a photographed image on the liquid crystal monitor 26 as shown in FIG. 9. Around the photographed image, there are provided various soft keys such as a key for editing of images, a key for memo editing, a key for copy or shift, a key for transmission, a key for quick transmission, a key for cancellation of an image, a key for selection of an image, and the like. In this state, the memo editing is selected by the touch pen to perform switching of the memo contents to the editing screen as shown in FIG. 10. If there are any changes in the memo contents, the soft keyboard is started up, causing editing operation to be carried out. After the editing operation, the OK key is selected to switch to the editing screen shown in FIG. 9. If not changes, a save key is selected so as to update the memo contents stored in the image file corresponding to the photographed data in the memory card 17 during reproduction.

When a plurality of titles is set and memo contents not shown on the liquid crystal monitor 26 are to be edited, the editing mode transfer switch 30 is depressed in the reproduction mode to start up the editing mode, whereby the memo contents are displayed with the title on the editing screen. If there are any changes in the memo contents, the soft keyboard is started up so as to perform editing operation. After editing, the OK key is selected to update the memo contents to be displayed on the liquid crystal monitor 26 and the memo contents stored in the memory card Now, a communication function of the photographed images will be explained below.

As shown in FIG. 9, there are displayed a transmission key ("SEND" in the figure), and a quick transmission key ("QUICK SEND" in the figure) on a reproducing screen in the reproduction mode. One of these keys is selected, so that a transmission file is generated based on the image being reproduced to be stored in a transmission tray. The mode switching dial 28 is operated to perform switching to a circuit mode, and a telephone line is connected, whereby the transmission file is transmitted through a predetermined communication scheme.

When the transmission key is selected, a desired one from among a plurality of communication schemes prepared, for example one of E-Mail scheme and FTP scheme, is chosen for the transmission. For the quick transmission key, since a communication scheme is previously set, an operation of specifying a communication scheme as required upon selection of the transmission key can be omitted.

Figure 11A:
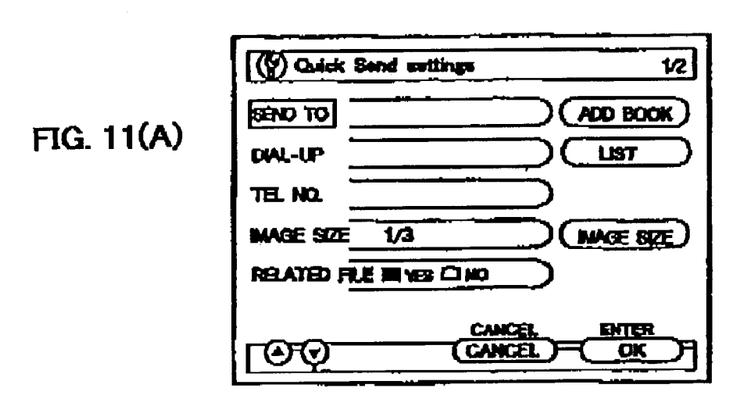
FIG. 11 is an explanatory diagram showing a setting screen for setting quick transmission.
Figure 11B:
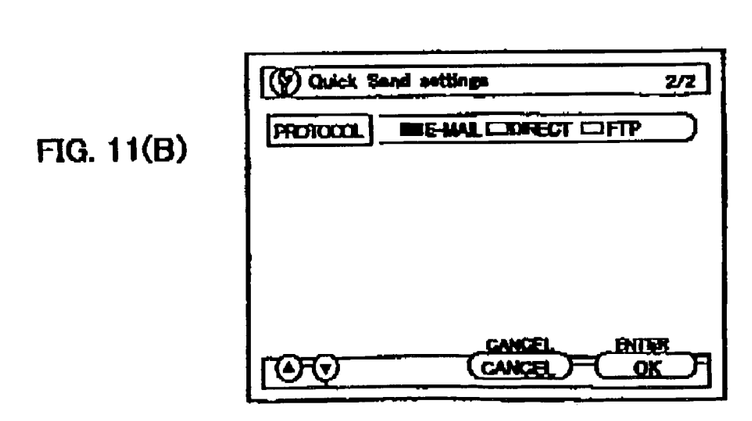

FIG. 11 shows a setting screen of the quick transmission, wherein there are provided in the set-up mode various settings of a transmission object end, dial-up, a telephone number, an image size, possibility of appending an associated file, and the quick transmission. In an example of FIG. 11, the E-Mail scheme is set as the communication scheme.

Figure 12:
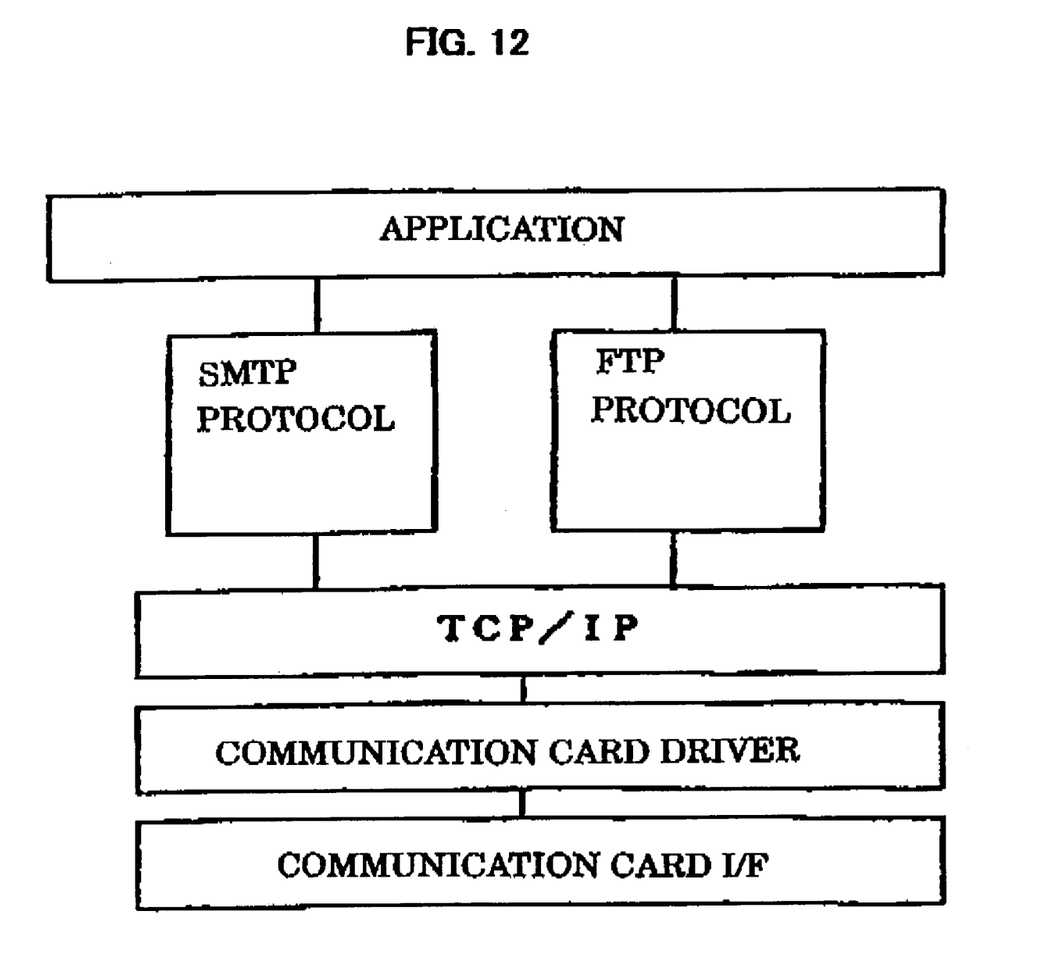
FIG. 12 is a block diagram showing software relative to communications mounted in the digital camera.

FIG. 12 shows software associated with communications that is installed in the digital camera. A communication card I/F is an interface of a communication card, such as PCMCIA, USB, or the like. The communication card is a wireless LAN, a modem of a portable telephone, or the like as recently coming into wide use. A communication card driver is driver software for gaining access to the communication card. On the driver is disposed TCP/IP software serving as a protocol on the Internet. On the software a SMTP protocol serving as a normal protocol of the E-Mail or a FTP file transmission protocol is disposed. These protocols are included in the software of the camera. In FIG. 12, two types of communication schemes are shown. As mentioned above, if the protocol to be normally used in the set-up mode is selectable and the quick transmission is selected, then the communication scheme specified as normal one is utilized for transmission. In normal transmission, a communication scheme is designated by a user to be used for transmission. It should be noted that in cases where the normal transmission is designated, the communication scheme specified as the protocol to be used in a normal manner in the set-up mode is appointed and displayed on the setting screen which is displayed on the liquid crystal monitor 26.

Accordingly, the quick transmission is provided as well as the normal transmission, thus permitting settings according to the user's operating condition thereby to meet various kinds of the user's needs.

Figure 13:
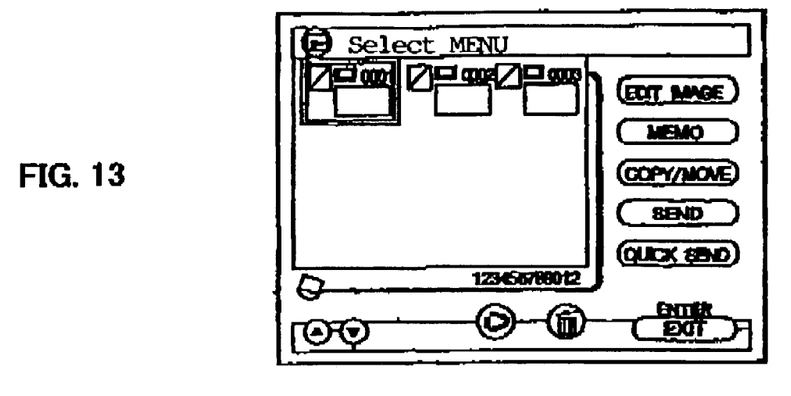
FIG. 13 is an explanatory diagram showing sumnail display in the reproduction mode.

In order to conveniently search for a desired image from the photographed data stored in the memory card 17, a sumnail display function is provided as shown in FIG. 13. When transmitting the photographed data, one or more sumnails of the photographed data to be sent are designated, and a transmission or quick transmission key is depressed. Thus the transmission file is generated and the telephone line is connected, causing the photographed data to be transmitted.

Figure 14:
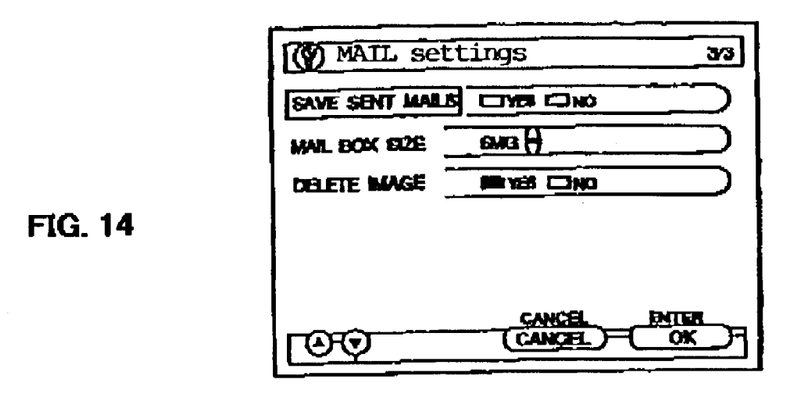
FIG. 14 is an explanatory diagram showing an example of a setting screen of e-mail transmission.
Figure 15:
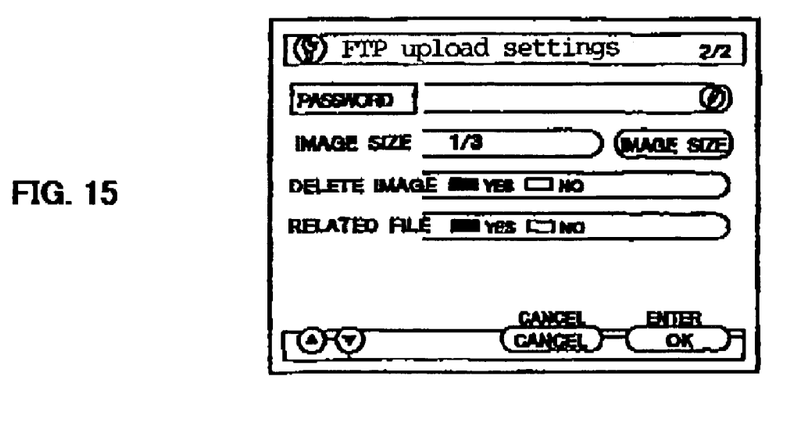
FIG. 15 is an explanatory diagram showing an example of a setting screen of FTP transmission.

There are provided setting items displayed in the setting screen for determining whether the file is canceled or not after transmission. When determining the cancellation of the file, that is, when designating "yes" in the item "DELETE IMAGE" as shown in FIG. 14 and FIG. 15, a transmission image stored in the memory card 17 is cancelled after succeeding in the transmission.

Figure 16:
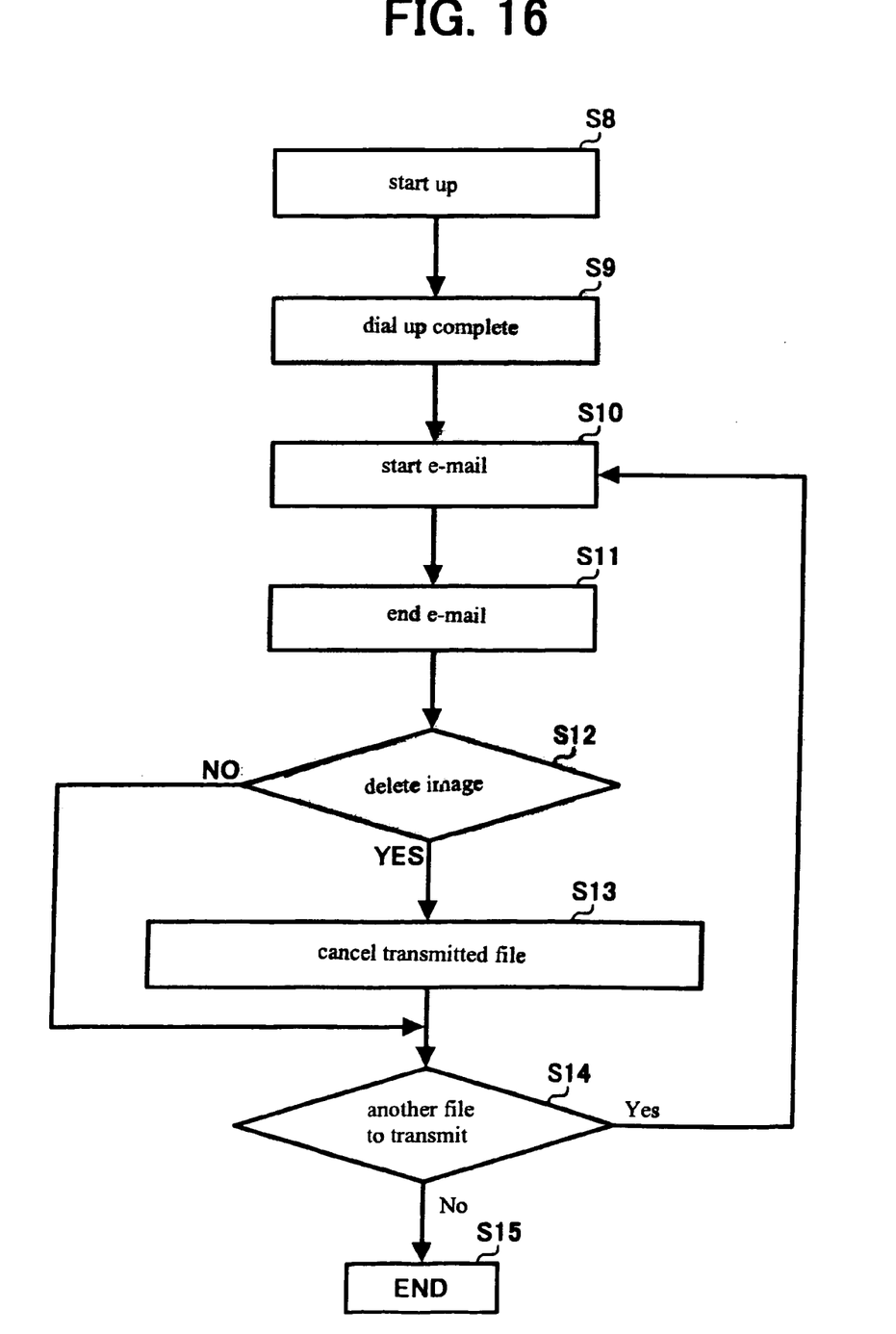
FIG. 16 is a flowchart showing an example of a dial-up connection upon the e-mail transmission.

As shown in FIG. 16, a file to be transmitted is first selected, and the transmission or quick transmission key is depressed, to store the transmission file. Next, the digital camera is connected to a telephone terminal, and the mode switching dial is operated to perform switching to the circuit mode, causing image communication processing to start up (S8). When the dial-up connection is completed (S9), the E-Mail transmission is started up (S10). After the transmission (S11), when designating "yes" in the item "DELETE IMAGE" on the E-Mail transmission setting screen (for YES in S12), the file already transmitted is cancelled from the memory card 17 or a built-in memory (S13). When there is another file not to be transmitted (for NO in S14), it is transmitted and then cancelled from the memory card 17 or the built-in memory. After the transmission files are all transmitted, the circuit or line is shut down, thereby bringing the communications to an end (S15).

This configuration prevents needless image files from remaining on the camera side, thus allowing maintaining enough capacity in the memory card 17.

According to the present invention having the above-mentioned configuration, the memo is attached together with the title to the header of the format storing the photographed image data therein, whereby such image data and memo data can be handled as one image file. Thus, when editing the photographed image on the personal computer, information on the image data is available by reading the header, thereby omitting an operation such as inputting characters by means of image editing application software. Further, the title displayed on the memo setting screen is able to be edited. For example when a plurality of pictures is taken, a title common to the respective photographed images can be set. Accordingly, this enables making effective use of the memo function according to any purposes of using the digital camera.

What is claimed is:

1. A digital camera comprising:

imaging means for photographing a subject, converting an optical image into an electric signal, and outputting image data including said electric signal;

display means for displaying a photographed image and various setting screens;

shutter means for outputting a fetching signal of said image data which serves as the photographed image;

mode switching means for switching various modes;

an information recording medium for recording said image data as an image file in a format for storage of the image data together with information associated with the image;

means for switching textual information to be added to the image data into a memo setting screen;

means for switching to a title setting screen that is adapted for setting a title to be displayed on the memo setting screen in response to the textual information; and means for switching to an editing screen for editing the textual information by inputting the textual information, wherein the display means includes a touch panel by which text data is input and the editing screen displays a software keyboard by which the textual information is input depending on a depression signal of the touch panel;

further comprising means for displaying on the monitoring screen the textual information inputted from the memo setting screen, while determining whether a function of recording in said information recording medium is performed or not in a set-up mode of setting various functions.

2. A digital camera comprising:

imaging means for photographing a subject, converting an optical image into an electric signal, and outputting image data including said electric signal;

display means for displaying a photographed image and various setting screens;

shutter means for outputting a fetching signal of said image data which serves as the photographed image;

mode switching means for switching various modes;

an information recording medium for recording said image data as an image file in a format for storage of the image data together with information associated with the image;

means for switching textual information to be added to the image data into a memo setting screen;

means for switching to a title setting screen that is adapted for setting a title to be displayed on the memo setting screen in response to the textual information; and means for switching to an editing screen for editing the textual information by inputting the textual information, wherein the display means includes a touch panel by which text data is input and the editing screen displays a software keyboard by which the textual information is input depending on a depression signal of the touch panel;

wherein, when switching display of said display means from a reproducing screen in a reproduction mode to said editing screen, on the memo setting screen displayed by said display means, the title and the textual information read from the information recording medium are displayed, and contents of the textual information are edited, so that contents recorded in said header are updated.

3. A camera comprising:

an optical image to electrical signal converter which inputs an optical image and outputs electrical image data;

a display which displays said electrical image data, said display including at least one type of a setting screen including a memo screen, or a title screen, or an edit screen, or a monitoring screen, or a reproducing screen;

a shutter which outputs a fetching signal of said electrical image data, said fetching signal serving as a photographed image;

a mode selector which switches from a first mode to a second mode of operation of said camera;

an information recorder which records said electrical image data as an image file in a format for storage of said electrical image data along with other information including new information associated with said electrical image data;

a text input device configured to add or alter old information with said new information in said memo screen; and a screen selector which switches from said at least one type of screen to said title screen, said title screen is configured to set a title which is to be displayed on said memo screen in response to an input of said new information;

said screen selector further switches from said at least one type of screen to said editing screen which edits said old information with said new information;

wherein said display includes a touch panel by which text data is input and said editing screen displays a software keyboard which inputs said new information depending on a depression signal of said touch panel;

wherein said display displays said new information input from said memo screen, on said monitoring screen, while a determination device of said display determines whether a function of recording of said information recorder is performed in a set-up mode of said display, said set-up mode sets up at least one of a plurality of functions.

4. A camera comprising:

an optical image to electrical signal converter which inputs an optical image and outputs electrical image data;

a display which displays said electrical image data, said display including at least one type of a setting screen including a memo screen, or a title screen, or an edit screen, or a monitoring screen, or a reproducing screen;

a shutter which outputs a fetching signal of said electrical image data, said fetching signal serving as a photographed image;

a mode selector which switches from a first mode to a second mode of operation of said camera;

an information recorder which records said electrical image data as an image file in a format for storage of said electrical image data along with other information including new information associated with said electrical image data;

a text input device configured to add or alter old information with said new information in said memo screen; and a screen selector which switches from said at least one type of screen to said title screen, said title screen is configured to set a title which is to be displayed on said memo screen in response to an input of said new information;

said screen selector further switches from said at least one type of screen to said editing screen which edits said old information with said new information;

wherein said display includes a touch panel by which text data is input and said editing screen displays a software keyboard which inputs said new information depending on a depression signal of said touch panel;

wherein said old information is updated according to said new information when said screen selector switches from said reproducing screen of a reproduction mode of said camera to said editing screen, on said memo screen, so that said title and said new information read from said information recorder are displayed, and so that contents recorded in a header are updated.

* * * * *